United States Patent [19]

Cyphers et al.

[11] Patent Number: 5,286,045
[45] Date of Patent: * Feb. 15, 1994

[54] PAINT CONTAINER RETAINER FOR PORTABLE PAINTING EQUIPMENT

[75] Inventors: Norman A. Cyphers, Rogers; Wayne M. Bekius, Milaca, both of Minn.

[73] Assignee: Wagner Spray Tech Corporation, Minneapolis, Minn.

[*] Notice: The portion of the term of this patent subsequent to Jun. 8, 2010 has been disclaimed.

[21] Appl. No.: 740,954

[22] Filed: Aug. 6, 1991

Related U.S. Application Data

[63] Continuation-in-part of Ser. No. 697,753, May 9, 1991, Pat. No. 5,217,238.

[51] Int. Cl.⁵ .............................................. B62B 1/04
[52] U.S. Cl. ............................. 280/47.18; 280/47.24; 280/47.26; 280/652; 248/311.2; 417/234
[58] Field of Search ............... 280/652, 659, 47.18, 280/47.19, 47.21, 47.24, 47.26, 47.28, 47.315, 47.34, 47.371, 47.39, 79.5, 47.41; 182/129; 180/6.2; 401/146; 239/150, 302; 414/234, 360, 457; 248/129, 210, 133, 211, 100, 212, 126, 311.2; 222/626; 417/413, 234, 572, 361

[56] References Cited

U.S. PATENT DOCUMENTS

| | | | |
|---|---|---|---|
| 3,254,845 | 6/1966 | Schlosser | 239/332 |
| 3,376,986 | 4/1968 | Farber | 414/457 |
| 3,598,420 | 8/1971 | Edlin | 414/457 |
| 3,623,661 | 11/1971 | Wagner | 239/127 |
| 3,743,188 | 7/1973 | Wagner | 239/575 |
| 4,003,504 | 1/1977 | Johnson et al. | 414/457 |
| 4,437,610 | 3/1984 | Huber et al. | 239/119 |
| 4,624,602 | 11/1986 | Kieffer et al. | 239/150 |
| 4,861,050 | 8/1989 | Bergeron | 280/79.5 |
| 4,893,751 | 1/1990 | Armstrong | 239/150 |
| 5,073,092 | 12/1991 | Gebauer et al. | 417/413 |

OTHER PUBLICATIONS

Wagner Spray Tech Corp., Bull. SL00054, Mar. 1990, Bull. SL00001, Nov. 1990, Bull. L12172, Bull. L12171, Bull. L12170, Nov. 1990, Bull. SL00096, Dec. 1990.

*Primary Examiner*—Richard M. Camby
*Attorney, Agent, or Firm*—Faegre & Benson

[57] ABSTRACT

A paint container retainer and convertible pump assembly cart for portable painting equipment. The retainer is adapted to support one of two differently sized paint containers in a generally upright position for providing a supply of paint for the sprayer. The paint container retainer also serves as a supporting foot and is interchangeable with a cart handle to convert the cart from a vertical to a horizontal orientation of the pump assembly.

12 Claims, 3 Drawing Sheets

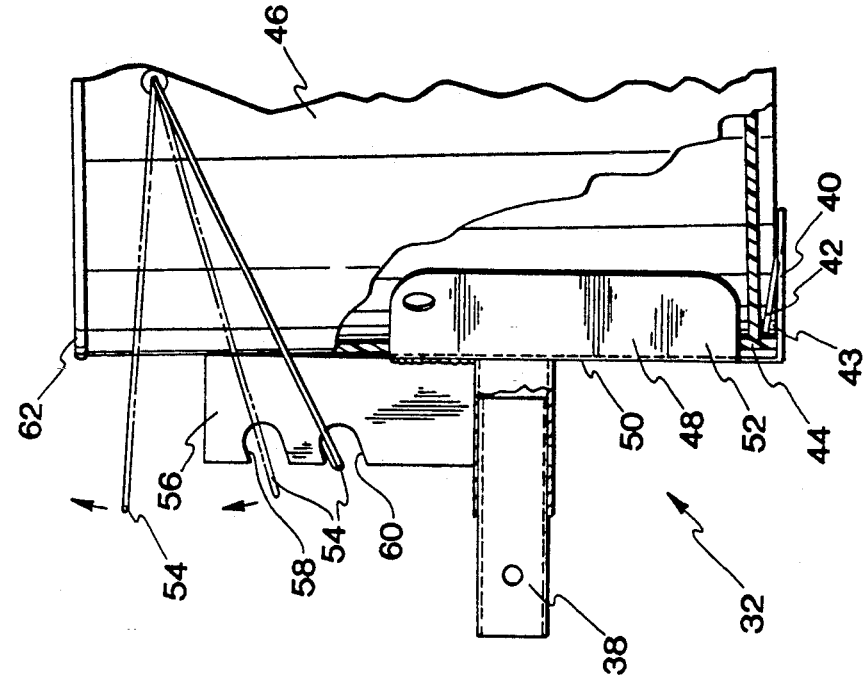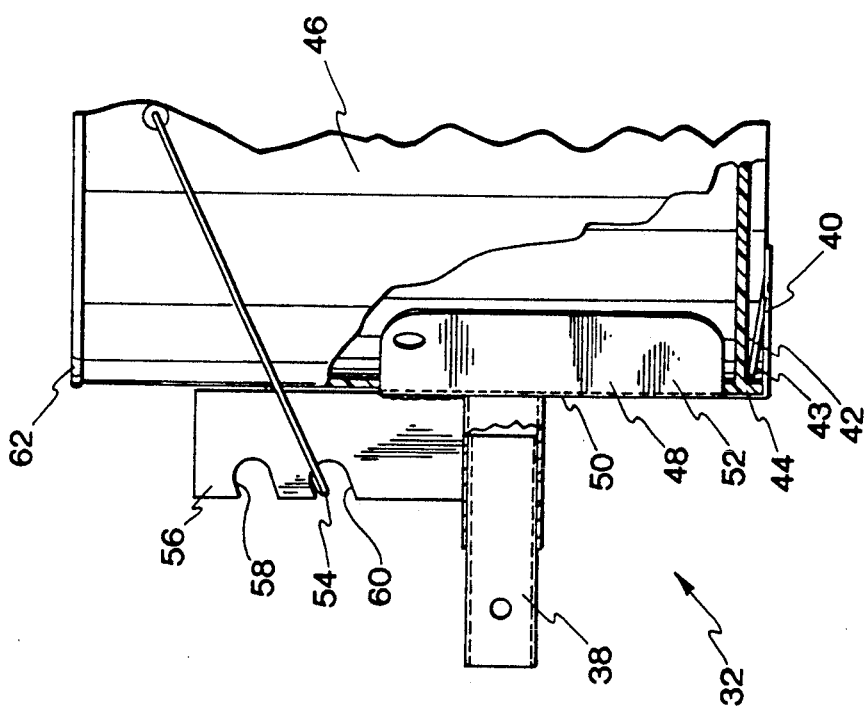

PAINT CONTAINER RETAINER FOR PORTABLE PAINTING EQUIPMENT

CROSS-REFERENCE TO RELATED APPLICATIONS

This application is a continuation-in-part of our co-pending application Ser. No. 07/697,753, filed May 9, 1991, now U.S. Pat. No. 5,217,238.

FIELD OF THE INVENTION

This invention provides a convertible cart for paint sprayers, such that the cart can readily be converted from supporting a pump assembly of a paint sprayer in a vertical (that is, upright) position to a horizontal (that is, prone) position, thus increasing the flexibility with regard to the types and sizes of paint supply reservoirs which can be used with the sprayer. The cart securely supports the pump assembly and sprayer in either position and can readily be wheeled about.

This invention also provides a paint container retainer as an attachment for the convertible cart. When the cart is in a horizontal position, the paint container retainer is attached to the cart in such a way as to function as a supporting foot for the cart, and a paint supply reservoir is provided by a refillable paint funnel hopper attached to and positioned above an inlet of the pump assembly. When the cart is in a vertical position, the paint container retainer is attached to the cart in such a way as to function both as a supporting foot for the cart and to support a conventional paint container such as a one gallon paint can or 5 gallon bucket. The retainer is designed to securely support either of these two differently sized paint containers in a generally upright position. When the cart is tilted to permit movement to a different location, the retainer is able to support either paint container for transport with the cart.

BACKGROUND OF THE INVENTION

Airless sprayers for spraying liquid spray products, such as paints, stains, lacquers and the like, may be comprised of relatively large and heavy equipment. It is often necessary to move such equipment both to and from a job site and around different locations at the job site, and it is often desirable to be able to move a paint supply reservoir along therewith.

Also, depending on the requirements of the particular job, the liquid spray product may be available in relatively smaller sized containers, such as one gallon paint cans, or relatively larger sized paint containers, such as five or ten gallon paint cans or even larger drums.

Commonly assigned, co-pending U.S. patent application Ser. No. 07/697,753, filed May 9, 1991, of which this application is a continuation-in-part, describes a convertible cart for such portable paint spraying equipment, designed so that a cart can readily be converted from an upright to a horizontal position while supporting a pump assembly of the paint sprayer. The present invention discloses a novel modification of the cart disclosed in Ser. No. 07/697,753, as will be more completely described further herein, which is provided with a novel paint container retainer.

SUMMARY OF THE INVENTION

A convertible cart for a portable paint sprayer supports a pump assembly alternatively in either a horizontal or a vertical position. The cart base has a first section and a second section, which sections intersect at substantially a right angle and each of which have distal ends remote from their intersection. The cart is provided with a wheeled axle at or near the intersection of the cart sections. Means are provided on the cart base for retaining the pump assembly. Also provided are a cart handle and a foot supporting means which can interchangeably be attached to the distal ends of either the first or second sections.

When the pump assembly is in the horizontal position, the first section of the cart base provides a horizontal base support for the cart, while the cart handle is attached to the second section distal end, and the foot supporting means is attached to the first section distal end. A paint supply reservoir is provided by a refillable paint hopper located above and attached to an inlet of the pump assembly.

When the pump assembly is in the vertical position, the second section of the cart base provides the horizontal base support for the cart, while the cart handle is attached to the first section distal end and the foot supporting means is attached to the second section distal end.

The foot supporting means is preferably a novel paint container retainer. The paint container retainer has a platform for supporting a paint container in a generally upright position. A collar extends upward from at least a portion of the platform perimeter for further supporting the paint container. A retainer hook is attached to the collar for retaining a wire bail of the paint container in a position generally below an upper rim of the paint container.

Thus, the paint container retainer supports a commercially sized paint container in a generally upright position. The cart and attached paint container retainer can be tilted, thereby elevating the paint container, so that the cart, with the attached paint container retainer and paint container, is movable to a desired location.

BRIEF DESCRIPTION OF THE DRAWINGS

FIG. 2 illustrates a side view of a paint container retainer of the present invention with a paint container securely retained thereon and with parts broken away to show supporting detail.

FIG. 3 is a view similar to FIG. 2, illustrating direction of release of a paint container wire bail from a retaining notch.

DETAILED DESCRIPTION OF THE INVENTION

Figure 1:
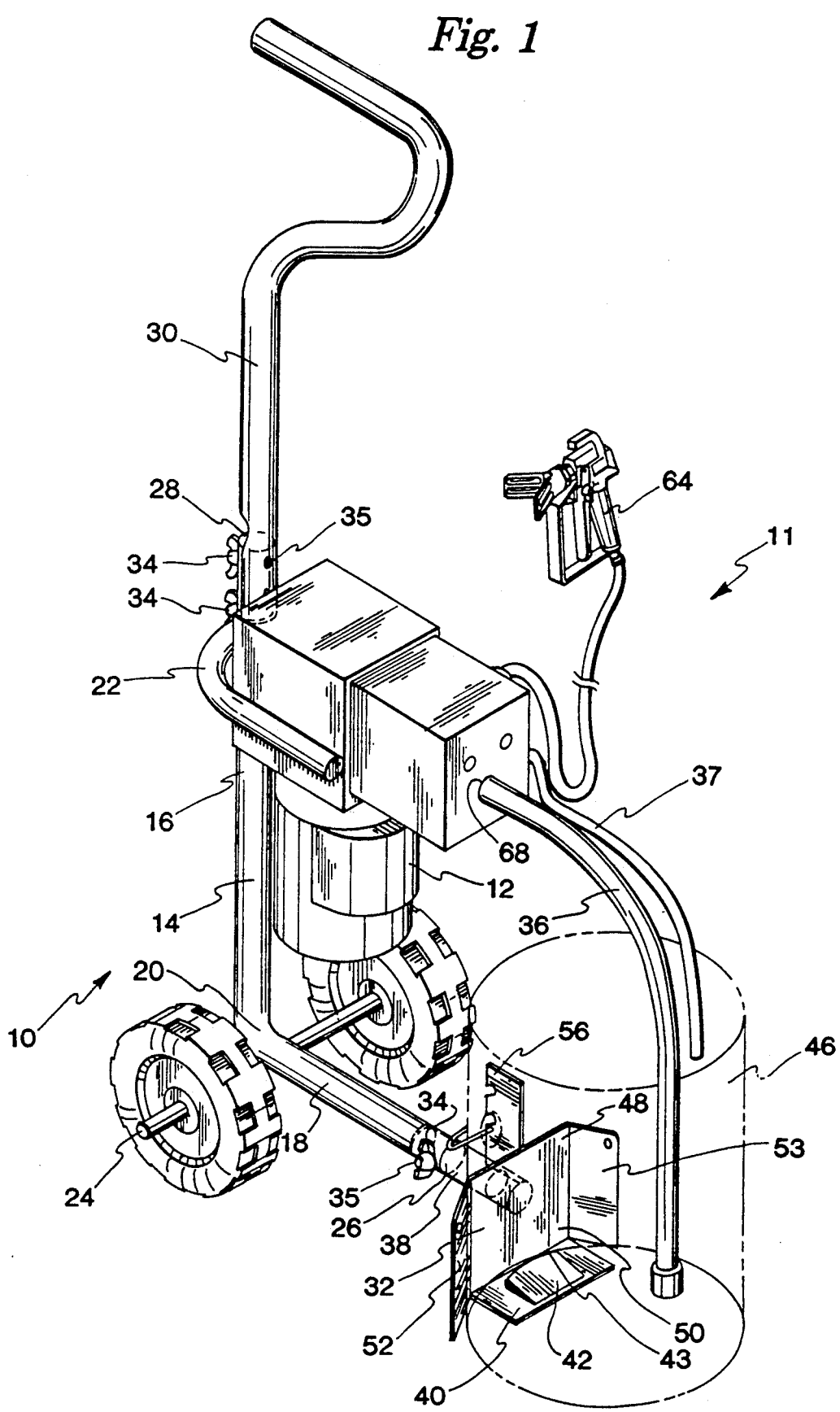
FIG. 1 illustrates a convertible cart of a pump assembly of the present invention in a vertical or upright position with a paint container retainer in position for supporting a paint container.
Figure 4:
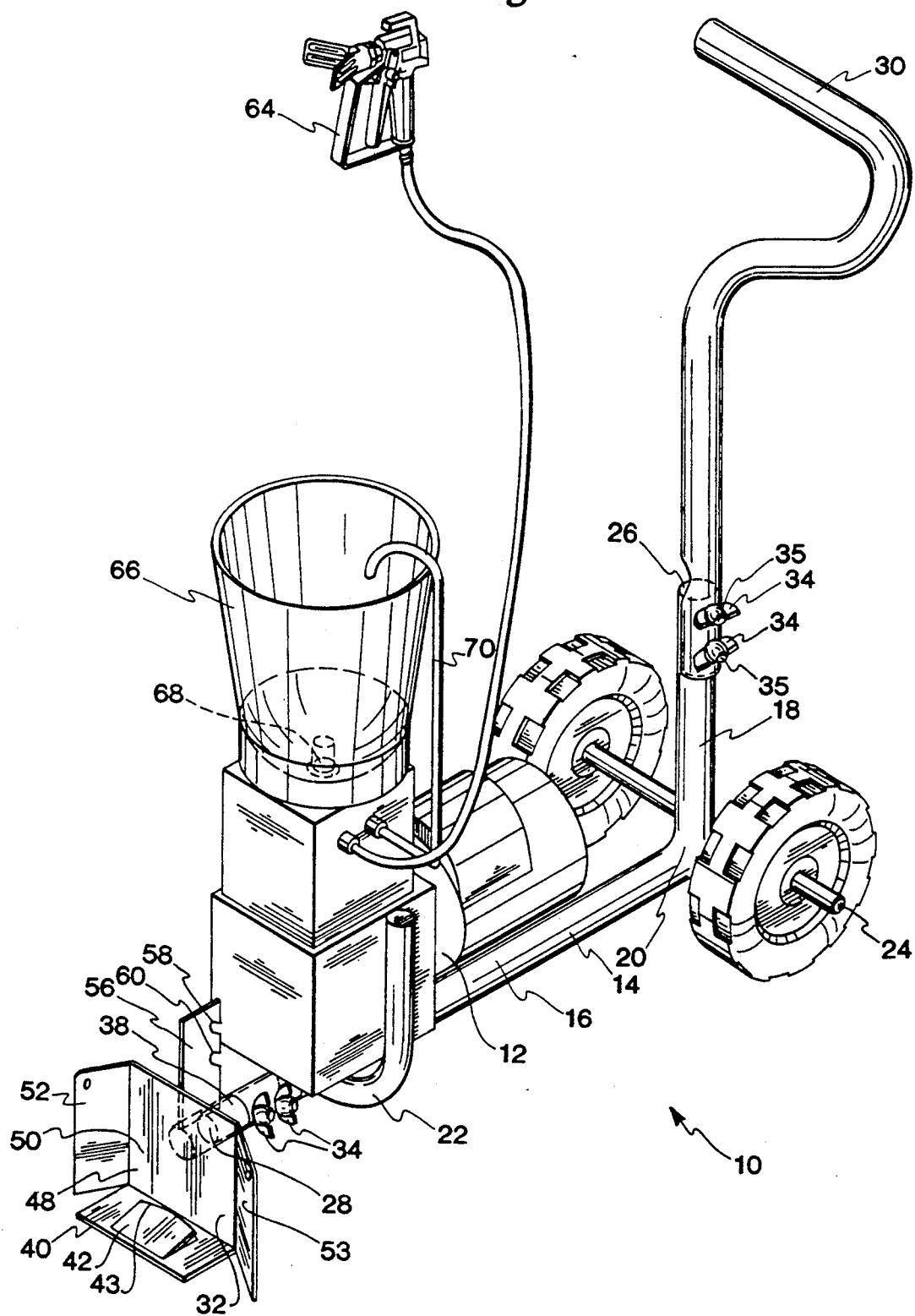
FIG. 4 illustrates a convertible cart of a pump assembly of the present invention in a horizontal or prone position with the paint container retainer serving as a supporting foot and a refillable paint hopper located above and attached to an inlet of the pump assembly.

FIGS. 1 and 4 illustrate a cart 10 for a portable paint sprayer 11 for alternately supporting a pump assembly 12 in a vertical position (see FIG. 1) or a horizontal position (see FIG. 4). A cart base 14 of cart 10 preferably has a first, relatively longer section 16 and a second, relatively shorter section 18 at substantially a right angle intersection 20. Pump assembly 12 is secured to cart base 14, for example by a bent arm retaining member 22 so that a longer dimension of assembly 12 is aligned along longer section 16. A wheeled axle 24 is secured, as by welding, to cart base 14 at or near intersection 20. A shorter base section distal end 26 and a longer base section distal end 28 are adapted for interchangeably retaining additional components of cart 10, as will now be described.

It is to be noted that pump assemblies, such as that referenced herein as pump assembly 12, are commercially available, for example, from Wagner Spray Tech Corporation, Minneapolis, Minn., and form no part of this invention per se. The pump assembly is thus not further described herein in detail as to construction or operation.

A cart handle 30 and a paint container retainer 32 are interchangeably attachable to either shorter base section distal end 26 or longer base section distal end 28. When cart handle 30 is attached to shorter base section distal end 26 and paint container retainer 32 is attached to longer base section distal end 28, cart 10 will be oriented with longer base section 16 horizontal to the supporting floor surface so that pump assembly 12 is in a generally horizontal position with cart 10 resting on wheeled axle 24 and paint container retainer 32 (FIG. 4). When cart handle 30 is attached to longer base section distal end 28 and paint container retainer 32 is attached to shorter base section distal end 26, cart 10 will be oriented with shorter base section 18 horizontal to the supporting floor surface, so that pump assembly 12 is in a generally vertical position, again with cart 10 resting on wheeled axle 24 and paint container retainer 32 (FIG. 1).

In the vertical position shown in FIG. 1, a suction tube 36 draws paint directly from a paint container 46 to pump assembly 12 for delivery to a spray gun 64. Excess paint is returned to a paint container 46 through a return tube 37. In the horizontal position shown in FIG. 4, paint is provided to pump assembly 12 (and therefore spray gun 64) through a refillable paint hopper 66 attached at an inlet 68. In this configuration, excess paint is returned to refillable paint hopper 66 through a return hose 70.

FIGS. 2 and 3 illustrate paint container retainer 32, which is removably attached to cart 10 by securing an extension 38 to shorter base section distal end 26 or to longer base section distal end 28 by a secure, releasable means, such as a wing nut 34 and carriage bolt 35 or similar retaining means. A retainer hook 56 is permanently attached to extension 38, as by welding, and contains a five gallon notch 58 and a one gallon notch 60, located so as to secure a wire bail 54 of an appropriate industry standard paint container 46 below an upper rim 62 of the container 46. A collar 48 is attached to extension 38 and retainer hook 56, as by welding, and preferably has a back section 50 and a first wing section 52 and a second wing section 53 angled as to back section 50 so as to help support paint container 46. A platform 40 is preferably welded to the end of collar 48, so that collar 48 extends vertically upward from a section of the perimeter of platform 40. A rim catcher 42 is preferably formed in platform 40 by displacing an edge of rim catcher 43 above the plane of platform 40 a predetermined distance large enough to prevent a perimeter lip 44 of paint container 46 from sliding off platform 40.

When cart 10 and attached paint container retainer 32 are tilted with paint container 46 in place, retainer hook 56 retains wire bail 54, which in turn retains paint container 46. As a result, paint container 46 is retained against collar 48, and platform 40. In this way, paint container 46 is movable with cart 10.

Both five gallon notch 58 and one gallon notch 60 are located and shaped so as to secure wire bail 54 of an industry standard five gallon or one gallon container, respectively, when cart 10 and attached paint container retainer 32 are tipped. FIG. 3 shows that when paint container retainer 32 is resting on the floor supporting surface, wire bail 54 may be removed from retainer hook 56 simply by moving bail 54 out of engagement with notch 60 and then lifting wire bail 54 in the direction of the arrows.

The invention is not to be taken as limited to all of the details thereof as modifications and variations thereof may be made without departing from the spirit or scope of the invention.

That which is claimed is:

1. A paint container retainer for supporting a paint container of the type having an upper rim and a wire bail on a paint sprayer pump assembly cart, the paint container retainer comprising:
   a platform having a perimeter adapted to support a paint container in a generally upright position;
   a collar extending upward from at least a portion of the perimeter for further supporting the paint container in a generally upright position;
   a retainer hook attached to the collar adapted to retain a wire bail of the paint container in a position generally below an upper rim of the paint container.

2. A paint container retainer according to claim 1, wherein the platform is generally planar.

3. A paint container retainer according to claim 2, further comprising a rim catcher projecting upward out of the planar surface of the platform.

4. A paint container retainer according to claim 1, further comprising means for releasably and securely attaching the paint container retainer to the pump assembly cart.

5. A paint container retainer according to claim 1, wherein the retainer hook is provided with a plurality of notches, each for retaining a wire bail of one of differently sized paint containers.

6. A convertible cart for a portable paint sprayer and pump assembly for alternatively supporting the pump assembly in a horizontal or a vertical position comprising:
   a cart base having a first section and a second section intersecting at substantially a right angle;
   a wheeled axle secured to the cart base;
   means on the cart base for retaining the pump assembly;
   a removable cart handle; and
   a removable foot supporting means for supporting a section of the cart;
   wherein the first section of the cart base provides a horizontal base support for the cart when the cart handle is attached to a second section distal end and the foot supporting means is attached to a first section distal end such that the pump assembly is supported in the horizontal position; and
   wherein the cart handle and foot supporting means are interchangeable such that the second section of the cart base provides horizontal base support for the cart when the cart handle is attached to the first section distal end and when the foot supporting means is attached to the second section distal end such that the pump assembly is supported in the vertical position.

7. A convertible cart according to claim 6, wherein the first section is longer than the second section.

8. A convertible cart according to claim 6, wherein the means for retaining the pump assembly comprises a U-shaped bent arm retaining member secured to the cart base.

9. A convertible cart according to claim 8, wherein the first section is a generally longer section, the second section is a generally shorter section, and the U-shaped bent arm is secured to the first section.

10. A convertible cart according to claim 6, wherein the foot supporting means is a paint container retainer for supporting a paint container having an upper rim and a wire bail; the paint container retainer comprising:
a platform having a perimeter and adapted to support the paint container in a generally upright position;
a collar extending upward from at least a portion of the perimeter for further supporting the paint container in a generally upright position;
a retainer hook attached to the collar for retaining a wire bail of the paint container in a position generally below an upper rim of the paint container.

11. A convertible cart according to claim 10, further comprising:
a paint hopper attached to the pump assembly for providing paint to the portable paint sprayer when the pump assembly is in the horizontal position.

12. A convertible cart according to claim 10, further comprising:
a suction tube for drawing paint from the paint container to the pump assembly for providing paint to the portable paint sprayer when the pump assembly is in the vertical position and
wherein the paint container retainer supports the paint container in a generally upright position, and the retainer retains the paint container to the cart for movement of the cart and paint container.

* * * * *